Dec. 13, 1955  K. M. ELLIOTT  2,726,994
METHOD OF CONSERVING RECYCLE GAS
Filed Aug. 6, 1952  3 Sheets-Sheet 1

INVENTOR.
Kenneth M. Elliott
BY
Francis F. Johnston
AGENT

United States Patent Office 2,726,994
Patented Dec. 13, 1955

2,726,994

METHOD OF CONSERVING RECYCLE GAS

Kenneth M. Elliott, Woodbury, N. J., assignor to Socony Mobil Oil Company, Inc., a corporation of New York Application August 6, 1952, Serial No. 302,943

6 Claims. (Cl. 196—50)

The present invention relates to hydrocarbon conversions which occur at super-atmospheric pressures in which a solid particle-form catalytic material is transferred from a zone of given pressure to a zone of higher pressure in the presence of a recycle gas and, more particularly, to hydrocarbon conversions in which a solid particle-form catalyst is transferred from a zone of given pressure to a zone of higher pressure in the presence of a recycle gas through a pressure lock system and removed from said zone of higher pressure to a zone of lower pressure in the presence of a recycle gas through a pressure lock system.

Typical of the hydrocarbon conversions to which reference is made hereinbefore is the reforming of mixtures of hydrocarbons containing hydrocarbons capable of participating in at least one of the molecular changes, isomerization, dehydrogenation and dehydrocyclization. It is customary in the art to class the aforesaid molecular changes as reforming. Reforming is most generally employed to produce gasolines of higher anti-knock rating than that of the stock charged to the convertor.

While reforming can be obtained in the absence of hydrogen, it is desirable to use a recycle gas in the reforming operation as a heat carrier even when not using a gas containing hydrogen. Consequently, it is economically desirable to conserve the recycle gas in order that the operation be self-sustaining with respect to the recycle gas. It is even more economically desirable to conserve the recycle gas when a hydrogen-containing recycle gas is used since any deficiency of the hydrogen-containing recycle gas will require addition of hydrogen from an extraneous source or without such addition of hydrogen will result in overloading the regenerator designed to operate at a given coke laydown obtained only in the presence of sufficient hydrogen-containing gas.

As presently operated, reforming reactors charged with solid particle-form catalyst at pressures of 15 to 600 p. s. i. a., and preferably at 100 to 300 p. s. i. a. through a pressure lock, use about 12,000 to about 300,000 standard cubic feet of recycle gas per hour or about 10 to more than 100 per cent of the total net make recycle gas in transferring the catalyst particles from a zone of given pressure to the reactor at a higher pressure and from the reactor to a regenerator at a lower pressure. As presently operated, the recycle gas used to pressure the catalyst transfer locks is lost except for its fuel value which is considerably less than its value as a pressuring gas at a pressure of 100 to about 300 p. s. i. a.

Accordingly, it is an object of the present invention to conserve the recycle gas used in transferring particle-form solid catalyst from a zone at a given pressure to a zone at a higher pressure. It is another object of the present invention to conserve the recycle gas used in transferring particle-form solid catalyst from a zone at super-atmospheric pressure to a zone at a lower pressure. It is a further object of the present invention to conserve the recycle gas used in transferring particle-form solid catalyst from a zone at a given pressure to a zone at a higher pressure, and from said zone at a higher pressure to a zone at a pressure lower than the aforesaid higher pressure. Other objects and advantages will become apparent to those skilled in the art from the following description taken in conjunction with the drawings in which:

The hydrocarbon conversion selected for illustration of the principles of the present invention is that of reforming a mixture of hydrocarbons containing hydrocarbons capable of participating in the molecular changes, isomerization, dehydrogenation and dehydrocyclization. Since the reactors and catalyst transfer means illustrated in Figures 2, 3, 4 and 5 can be used with equal facility in place of the reactor and catalyst transfer means illustrated in Figure 1, it will be necessary to describe the whole operation only in conjunction with Figure 1, a description of the method of operating the reactor and catalyst transfer means illustrative of the principles of the present invention in conjunction with Figures 2, 3, 4 and 5 being sufficient for those skilled in the art.

For simplicity of description, the course of the catalyst through the reactor and regenerator will be described and then the path of the reactant and conversion products thereof will be traced.

Figure 1:
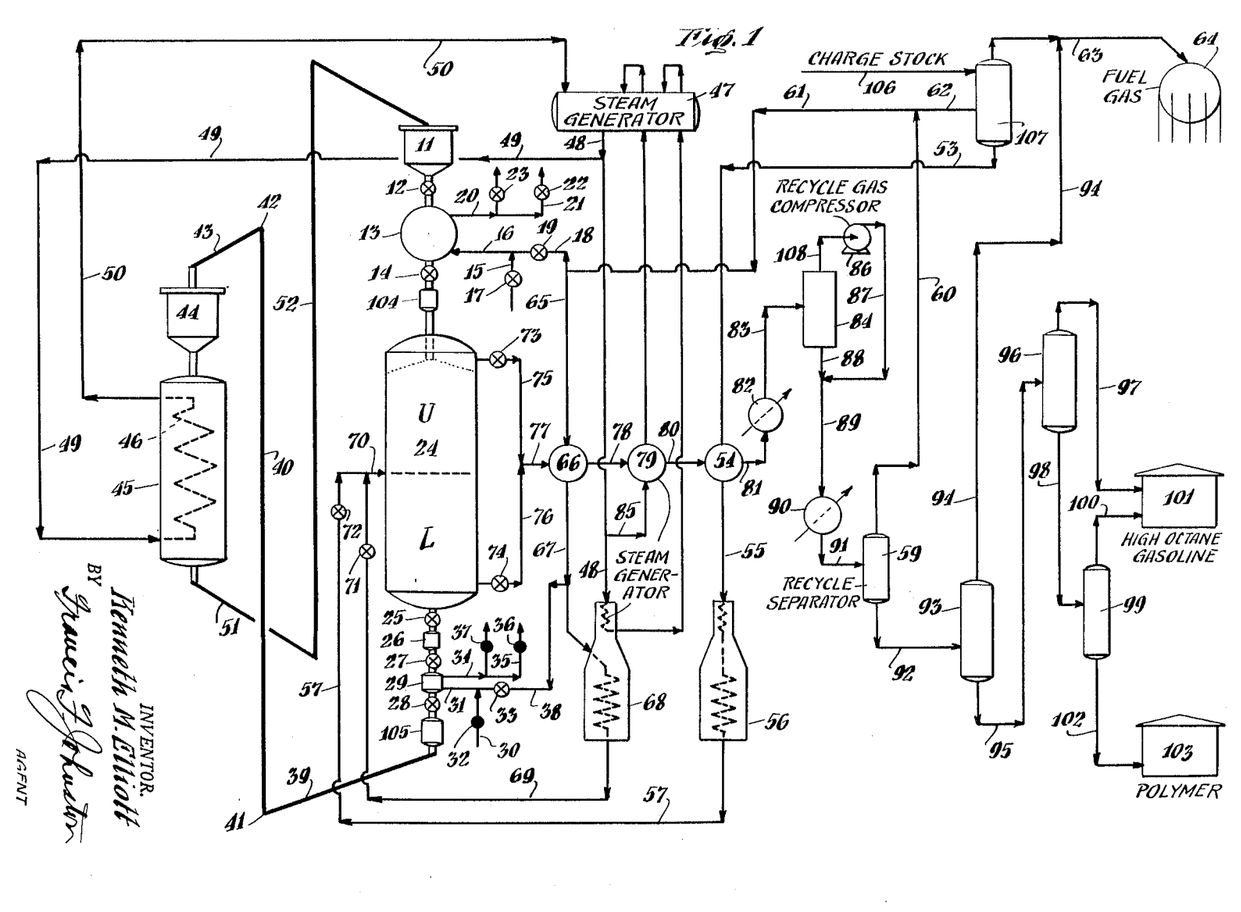
Figure 1 is a highly schematic flow-sheet of a hydrocarbon conversion operating at pressures of about 15 to about 600 p. s. i. a., and preferably at about 100 to about 300 p. s. i. a., in the presence of a recycle gas in which the catalyst particles are introduced into the reactor and withdrawn from the reactor through pressure lock systems without conserving the recycle gas.

Referring to Figure 1, active catalyst in reactor feed bin 11 flows into a reactor-sealing means and particle-transfer means comprising gas-tight valves 12 and 14 and intermediate pressuring chamber 13. This reactor-sealing and particle-transfer means is operated in a cyclic manner as follows:

With gas-tight valves 12 and 14 closed, pressure chamber 13 is purged with an inert and/or non-flammable gas such as flue gas drawn from a source, not shown, through pipes 15 and 16 under control of valve 17 with valve 19 closed and vented to a flare, not shown, through lines 20 and 21 under control of valve 22 with valve 23 closed. Valve 12 is opened and catalyst flows into pressuring chamber 13 to fill the chamber to a predetermined level. Gas-tight valve 12 is then closed, valves 17, 22 and 23 closed and valve 19 opened whereby pressuring gas such as recycle gas is introduced into pressuring chamber 13 through lines 61 and 18 and 16 until the pressure therein is at least that of reactor 24 and preferably about 5-to-10 p. s. i. higher. Gas-tight valve 14 then is opened and the catalyst flows into surge chamber 104. Valve 14 is closed and valve 23 then is opened and the residual gas in pressure chamber 13 is vented to a flare, not shown. This completes the cycle.

The catalyst flows from surge chamber 104 into and downwardly through reactor 24 as a substantially compact column contacting the upwardly flowing vapors of the charge mixture therein. During passage through the reactor, the catalyst becomes spent and contaminated with a carbonaceous deposit. The spent catalyst leaves the reactor through a catalyst flow-control device such as throttle valve 25. When operating at pressures in excess of atmospheric and when the kiln is operating at a pressure below that of the reactor, it is preferred to transfer the spent catalyst from the reactor to a catalyst transfer means, whereby the spent catalyst is transported to the kiln, by any suitable means whereby solid particles can be transferred from a zone of high pressure to a zone of less pressure. The catalyst flows through catalyst flow control means 25 into surge tank 26 from which it is removed in any suitable manner as by a pressure lock.

The pressure lock formed between gas-tight valves 27 and 28 includes depressuring chamber 29 and operates in a cyclic manner similar to the pressuring lock at the top of the reactor previously described hereinbefore. Thus, with gas-tight valves 27 and 28 closed, depressuring chamber 29 is purged with an inert and/or non-flammable gas such as flue gas. The purge gas is drawn from a source not shown through pipes 30 and 31 under control of valve 32 with valve 33 closed and vented to a flare, not shown, through pipes 34 and 35 with valve 36 open and valve 37 closed. Valves 32 and 36 are closed and pressuring gas such as recycle gas is drawn through pipes 38 and 31 with valve 33 open and introduced into depressuring chamber 29 until the pressure therein is that of surge tank 26. Valve 33 is closed and gas-tight valve 27 opened. Catalyst flows into depressuring chamber 29 to fill it to a predetermined level. Gas-tight valve 27 is closed, valve 37 opened and the gas in depressuring chamber 29 vented to a flare until the pressure in chamber 29 is reduced to that of the kiln or regenerator. Gas-tight valve 28 then is opened and the catalyst flows into surge chamber 105 and thence into chute 39. This completes the cycle.

The spent catalyst flows along chute 39 to any suitable catalyst transfer means suitable for transporting the spent catalyst to the kiln or regenerator. Suitable catalyst transfer means include gas-lifts and the like, elevators, etc. For the purpose of discussion, an elevator 40 is illustrated. The catalyst flows along chute 39 to the boot 41 of bucket elevator 40 more fully described in U. S. Patent No. 2,409,596. The catalyst in elevator boot 41 is picked up by the elevator buckets and raised to the elevator head 42 where it is discharged into chute 43 along which it flows to spent catalyst hopper 44 atop of kiln or regenerator 45.

Kiln or regenerator 45 is of any suitable type wherein the carbonaceous deposit on the spent catalyst can be burned off in a stream of combustion supporting gas, such as air, at temperatures of about 600° to 1400° F., and preferably at about 700° to 1000° F., at pressures of 15 to 600, preferably at 15 to 35 p. s. i. a. A suitable kiln is described more fully in U. S. Patent No. 2,469,332. However, the kiln 45 illustrated is provided with cooling coils represented by 46 through which water drawn from drum 47 by means of pipes 48 and 49 is passed and returned to steam drum 47 through pipe 50.

The spent catalyst passes downwardly from hopper 44 through kiln 45 to chute 51 by means of which the regenerated or reactivated catalyst is carried to a suitable catalyst transfer device, such as a gas-lift or the like, or as illustrated, a bucket elevator 52 by means of which the active catalyst is raised to the reactor catalyst feed bin 11 ready for another cycle through the reactor and kiln.

Returning now to the reactor, the course of the reactant and reformate will be followed. A mixture of hydrocarbons containing hydrocarbons capable of undergoing at least one of the molecular changes, isomerization, dehydrogenation and dehydrocyclization, such as a petroleum naphtha, is drawn from a source not shown through line 106 and introduced into absorber 107 wherein the naphtha or charge stock contacts the make gas. Absorber 107 is of any type suitable for gas-liquid contact and stripping the gas of light hydrocarbons. The make gas is produced in the reactor during the reforming reaction. Through contact with the net make gas in absorber 107, the charge stock strips light hydrocarbons from the gas and leaves absorber 107 through line 53 and passes through heat exchanger 54 where it is in indirect heat exchange with the reformate. From heat changer 54, the charge stock passes by line 55 to charge stock heater 56 wherein the temperature of the charge stock is raised to a temperature above the reaction temperature but below that of thermal reforming or cracking. The temperature of the charge stock will usually be about 850 to about 1080° F. and preferably about 960° to 1060° F. The charge stock leaves heater 56 through line 57.

The recycle gas is separated from the condensed hydrocarbons of the reformate in separator 59, leaves separator 59 by way of pipe 60 to pipe 61 where the net gas produced is passed through line 62 to absorber 107. After contact with the charge stock in absorber 107, as described hereinbefore, the stripped gas passes out of absorber 107 through pipe 63 to fuel gas holder 64.

The balance of the recycle gas in pipe 61 flows therethrough to pipe 65, passes through heat exchanger 66 wherein it is in indirect heat exchanger with reformate and passes through pipe 67 to recycle gas heater 68.

In recycle gas heater 68 the recycle gas is heated to a temperature such that when mixed with the charge stock to form a charge mixture, the charge mixture enters the reactor 24 at a temperature of about 850° to 1080° F. and preferably about 960° to 1060° F. To attain this end the recycle gas is heated in furnace 68 to about 1000° to about 1300° F.

The heated recycle gas leaves heater 68 through pipe 69. Heated charge stock in line 57 and heated recycle gas in pipe 69 are mixed in line 70 by regulation of valves 71 and 72, respectively, to give a charge mixture containing charge stock and recycle gas in the mol ratio of 1 to 15 mols of recycle gas to 1 mol of charge stock, and preferably about 4 to about 10 mols of recycle gas per 1 mol of charge stock. The average molecular weight of the charge stock is determined in the usual manner from the A. S. T. M. distillation curve.

When the charge stock is to be reformed in the presence of hydrogen, it is preferred to use a recycle gas containing about 25 per cent to about 80 per cent, and preferably about 35 per cent to about 60 per cent hydrogen, balance $C_1$ to $C_6$ hydrocarbons. Such a hydrogen-containing recycle gas is mixed with the charge stock in the ratio of about 1 to about 8, preferably about 2 to about 5 mols of hydrogen per mol of charge stock. The average molecular weight of the charge stock being determined in the usual manner from the A. S. T. M. distillation curve.

The charge mixture of charge stock and recycle gas enter reactor 24 through line 70 and its associated distributor not shown. The distributor can be of any type whereby the charge mixture can be spread over substantially the entire cross-section of reactor 24.

The charge mixture flows from the distributor (not shown) both upwardly counter-current to the downwardly flowing substantially compact column of particle-form solid reforming catalyst and downwardly concurrent with the downwardly flowing substantially compact column of particle-form solid reforming catalyst. The upwardly flowing vapors of charge mixture in contact with the catalyst and the hydrocarbons therein capable of being reformed are reformed and the reformate so produced together with recycle gas and make gas leave zone U through line 75 under control of valve 73. The charge mixture flowing downwardly in contact with the catalyst in zone L likewise is reformed and the reformate together with recycle gas and make gas flows from zone L through line 76 under control of valve 74.

The effluents from both zones admix and flow along line 77 to heat exchanger 66, thence through line 78 to heat exchanger 79, thence through line 80 to heat exchanger 54. From heat exchanger 54 the mixed effluents flow through line 81 to condenser 82 and thence through line 83 to gas-liquid separator 84.

In separator 84 the condensed effluent is withdrawn through line 88 while the uncondensed effluent flows along pipe 108 to compressor 86, thence through pipe 87 to line 88 where the compressed uncondensed effluent mixes with the condensed effluent. The mixture of condensed and uncondensed effluent flows under pressure along line 89 to condenser 90 and thence along line 91 to gas-liquid separator 59.

In separator 59 the uncondensed effluent, i. e., recycle gas and light hydrocarbons, flows along pipe 60 to pipe 62. A portion passes along pipe 62 to absorber 107 and the balance flows along pipe 61 to process use.

The condensed effluent is withdrawn from separator 59 through line 92 to depropanizer 93 from which the overhead is vented along pipe 94 to pipe 63 and fuel gas reservoir 64. The bottoms from depropanizer flow through line 95 to primary re-run tower 96 from which the overhead flows via line 97 to storage 101 while the bottoms flow along line 98 to secondary re-run tower 99. The overhead from tower 99 flows to storage 101 through line 100. The bottoms from re-run tower 99 flow through line 102 to polymer storage 103.

It will be noted that in the reforming process, described hereinbefore, all of the recycle gas used in pressuring chambers 13 and 29 is vented to the refinery fuel system. In contradistinction to this loss of recycle gas and expenditure of energy in compressing such vented gas, in accordance with the principles of the present invention this loss is reduced to a minimum.

Figure 2:
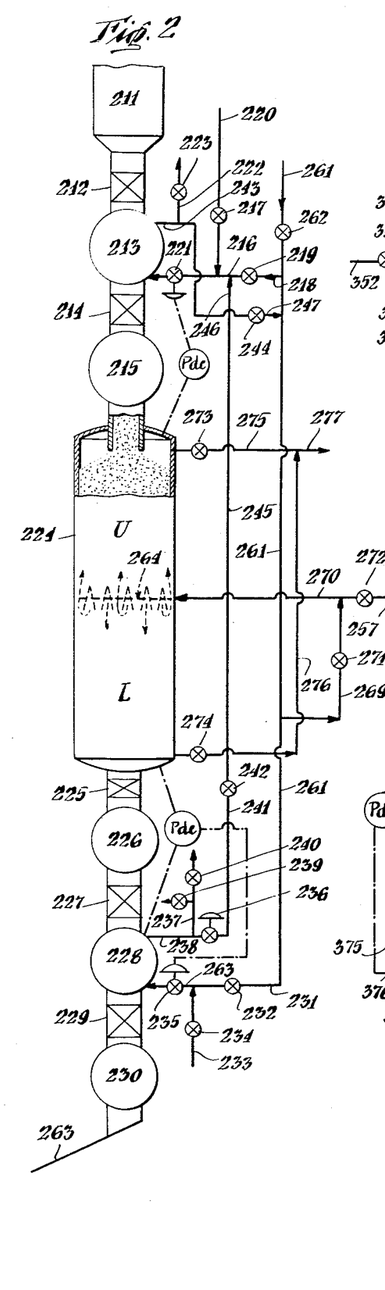
Figure 2 is a highly schematic representation of a reactor and catalyst pressuring and depressuring locks illustrating the principles of the present invention.

Thus, in Figure 2, provision is made to use the same volume of the recycle gas for pressuring a plurality of times.

Active catalyst in reactor feed bin 211 flows into the reactor sealing and particle-transfer means comprising gas-tight valves 212 and 214 and intermediate pressuring chamber 213. This reactor-sealing and particle-transfer means is operated in a cyclic manner as follows: With gas-tight valve 214 closed, gas-tight valve 212 is opened and catalyst flows into pressuring chamber 213 to fill chamber 213 to a predetermined level. Gas-tight valve 212 is closed and chamber 213 and its contents are purged with an inert and/or non-flammable gas such as flue gas drawn from a source not shown through pipe 220 under control of valve 217 and pipe 216 with valve 219 closed and valve 221 open and the purge vented through pipes 243 and 222 with valve 223 open and valve 244 closed. Valves 217 and 223 are closed and a suitable pressuring gas such as recycle gas, for example, a recycle gas comprising about 25 to about 80 per cent preferably about 35 to about 60 per cent hydrogen and the balance $C_1$ to $C_6$ hydrocarbons flows under pressure from a source not shown through pipes 261, 218 and 216 with valves 219 and 221 open and valve 242 closed into chamber 213 until the pressure therein is at least equal to and preferably slightly greater than, say 5 to 10 p. s. i., the pressure in reactor 224. When the pressure in chamber 213 attains the aforesaid pressure, valves 221 and 219 close. Then gas-tight valve 214 opens and the catalyst flows into surge bin 215. Gas-tight valve 214 closes and the cycle of this pressuring lock is completed with the pressure in pressuring chamber 213 at least that of the reactor 224.

The deactivated catalyst flows from reactor 224 through catalyst flow control means 225, which can be a throttle valve, into surge chamber 226. Since the kiln or regenerator not shown is operated at a pressure below that of the reactor, a reactor sealing and catalyst particle-transfer means is provided for removing deactivated catalyst from reactor 224.

The reactor-sealing and catalyst particle-transfer means comprises gas-tight valves 227 and 229 and intermediate depressuring chamber 228. The reactor-sealing and catalyst particle-transfer means operates in a cyclic manner as follows: With gas-tight valves 227 and 229 closed, a suitable pressuring gas such as the recycle gas in pressuring chamber 213 flows through pipes 243, 247, 261, 231 and 263 under control of valves 244, 232 and 235 with valves 217, 219, 262, 221, 223, 239, 240 and 234 closed into chamber 228 until the pressure in chamber 228 is equal to that in chamber 213. Valve 244 then closes and valve 262 opens to permit recycle gas from a source not shown to flow along pipes 261, 231 and 263 into depressuring chamber 228 until the pressure therein is about equal to that in reactor 224. Valves 235 and 232 close and gas-tight valve 227 opens. Deactivated catalyst flows from surge bin 226 through gas-tight valve 227 into depressuring chamber 228 to a predetermined level when gas-tight valve 227 closes. This completes the cycle. In the interval between the equalization of of the pressures in chambers 213 and 228 and filling of chamber 228 with catalyst from surge bin 226, pressuring chamber 213 has been filled to a predetermined level with active catalyst and purged with flue gas. Consequently, pressuring chamber 213 is ready for pressuring. The gas for pressuring chamber 213 is obtained in part from chamber 228 by allowing recycle gas in chamber 228 to flow along pipes 238, 241, 245 and 216 under control of valves 236, 242 and 221 until the pressure in chambers 228 and 213 are equal. Then valves 236 and 242 close. The residual gas in chamber 228 then is vented and the contents of chamber 228 purged with inert and/or non-flammable gas drawn from a source not shown through pipe 233 under control of valve 234 and the purge vented through pipes 238, and 237 with valve 239 open and valve 240 closed. The pressure in chamber 213 is then raised to at least that of the reactor and preferably slightly, say 5 to 10 p. s. i., higher than the pressure in the reactor by permitting gas under pressure to flow from pipes 261 and 216 with valves 262, 219 and 221 open and with valves 244, 217 and 223 closed. Gas-tight valve 214 opens and the catalyst flows into surge bin 215 leaving the gas in pressuring chamber 213 ready for use in depressuring chamber 228. It is manifest that about one-half as much recycle gas is required for the two catalyst transfer means just described as is required for the operation of transfer means of equivalent capacity by the method described in conjunction with the discussion of Figure 1. In other words, the present method of reforming hydrocarbons requires about 0.5 as much recycle gas for operation of the pressuring and depressuring chambers as is required by the prior methods of operating similar catalyst transfer means.

The deactivated catalyst after purging of chamber 228 and its contents flows into surge bin 230 and thence via chute 263 to catalyst transfer means (not shown) by which the deactivated catalyst is transferred to a kiln or regenerator such as shown in Figure 1.

Heated hydrocarbon reactant, i. e., a hydrocarbon or a mixture of hydrocarbons comprising hydrocarbons capable of undergoing at least one of the molecular changes, isomerization, dehydrogenation and dehydrocyclization flows from a furnace, not shown, through line 257 under control of valve 272 into line 270. Recycle gas heated in a furnace, not shown, flows through pipe 269 under control of valve 271 into line 270 where it is mixed with the aforesaid heated hydrocarbon reactant in the ratio of about 1 to about 15, preferably about 4 to about 10, mols of recycle gas, or about 1 to about 8, preferably about 2 to about 5, mols of hydrogen per mol of hydrocarbon reactant. The average molecular weight of a mixture of hydrocarbons being determined in the usual manner from the A. S. T. M. distillation curve. The heated charge mixture so formed flows along line 270 to distributor 264 from which the charge mixture flows partly upward counter-current to the downwardly flowing substantially compact column of particles of catalyst and partly downward concurrent with the downwardly flowing substantially compact column of particles of catalyst.

The vaporous contents of reforming zone U is withdrawn through line 275 under control of valve 273. The vaporous contents of zone L is withdrawn through line 276 under control of valve 274. The effluents from zones U and L are mixed in line 277 and flow to heat exchangers, gas-liquid separators and fractionators as shown in Figure 1.

Figure 3:
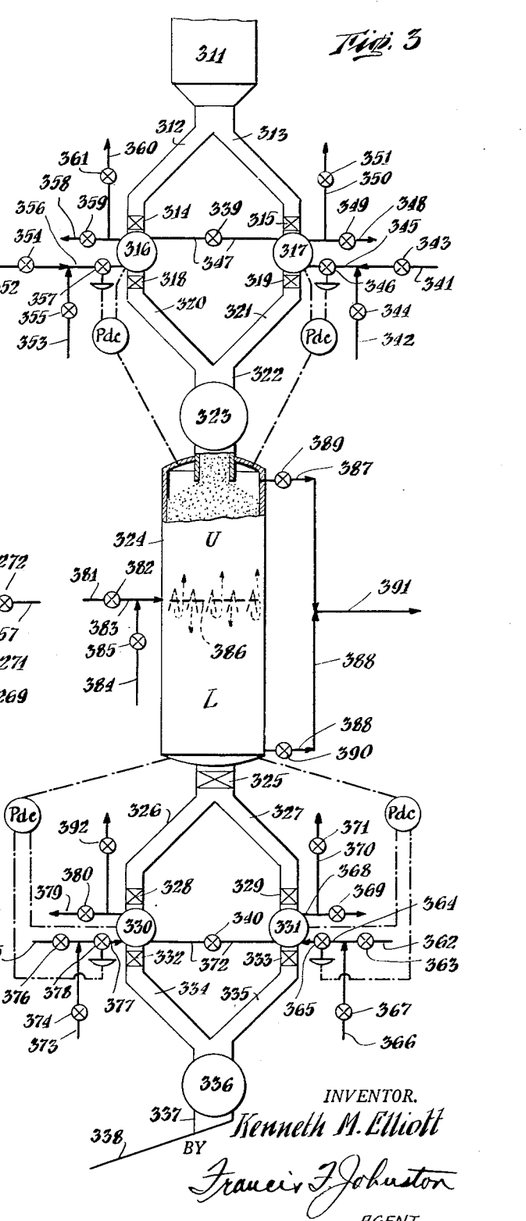
Figure 3 is a highly schematic representation of a reactor and catalyst pressuring and depressuring locks illustrating the principles of the present invention.

A schematic flow sheet illustrating a method of reforming hydrocarbons in accordance with the principles of the present invention wherein 2 pairs of pressuring locks used to transfer the catalyst from the reactor feed bin to the reactor and to transfer the catalyst from the reactor to the regenerator are shown, is given in Figure 3.

Catalyst in reactor feed bin 311 flows into conduits 312 and 313. The catalyst is transferred to surge chamber 323 alternately through reactor sealing and catalyst transfer means comprising gas-tight valves 314 and 318, intermediate pressuring chamber 316 and conduit 320 and the alternate reactor sealing and catalyst transfer means comprising gas-tight valves 315 and 319, intermediate pressuring chamber 317 and conduit 321.

Starting with chambers 316 and 317 empty and with valves 314, 318, 315 and 319 closed, the cyclic operation is as follows: Gas-tight valve 314 opens and catalyst flows from conduit 312 into pressuring chamber 316 to a predetermined level. Valve 314 is closed and the contents of chamber 316 purged with an inert and/or non-flammable gas such as flue gas drawn from a source not shown through pipes 353 and 356 under control of valve 355 with valve 357 open and valve 354 closed. The purge is vented through pipe 358 with valves 339 and 361 closed and valve 359 open. After purging chamber 316, valve 359 is closed and a suitable pressuring gas such as recycle gas drawn from a source not shown and under a pressure somewhat higher than that of reactor 324, flows through line 352 under control of valve 354 with valve 355 closed and valve 357 open. When the pressure in chamber 316 is at least equal to that of reactor 324 and preferably about 5 p. s. i. higher, pressure differential operated valve 357 closes followed by the closing of valve 354. Thus, at this point in the cycle, chamber 316 contains catalyst under a pressure at least equal to that in reactor 324. Preparation now is made to fill chamber 317 with catalyst. Thus, gas-tight valve 315 is opened and catalyst flows into chamber 317 to a predetermined level. Gas-tight valve 315 is closed and chamber 317 and its contents are purged with an inert and/or non-flammable gas such as flue gas drawn from a source not shown through pipes 342 and 345 under control of valve 344 with valves 343 closed and valve 346 open. The purge is vented through pipe 348 with valve 351 closed and valve 349 open. At this point chamber 317 and the catalyst therein is at atmospheric pressure and ready to be pressurized, while the catalyst in chamber 316 is under at least reactor pressure and ready to be emptied. Gas-tight valve 318 opens and the catalyst flows through conduits 320 and 322 to surge bin 323 which is at about reactor pressure. When chamber 316 is empty of catalyst, gas-tight valve 318 closes and valve 339 in pipe 347 opens. As a result, pressuring gas flows from chamber 316 which is at about the pressure of the reactor through pipe 347 into chamber 317 raising the pressure therein to about one-half that of the reactor. When the pressure in chamber 317 is about equal to that in chamber 316, valve 339 closes and valves 343 and 346 in pipes 341 and 345, respectively, open and recycle gas flows into chamber 317 until the pressure therein is at least equal to that in reactor 324 and preferably somewhat higher. When the predetermined pressure in chamber 317 has been attained, valves 346 and 343 close and gas-tight valve 319 opens permitting the catalyst in chamber 317 to flow through conduits 321 and 322 into surge chamber 323 and the cycle is completed. Meanwhile, valve 361 in line 360 is opened and the remaining gas in chamber 316 is vented to a fuel gas line not shown. Chamber 316 is again purged with flue gas from line 353 under control of valve 355. After purging, valve 314 is opened and chamber 316 refilled with catalyst thus beginning a new cycle.

The catalyst flows from surge chamber 323 into and through reactor 324 as a substantially compact column of particles of catalyst. During its passage through reactor 324, the catalyst is deactivated by a deposit of carbonaceous contaminant which is removed by burning the deposit off in a combustion-supporting stream of gas such as air in a suitable kiln or regenerator, not shown.

The deactivated catalyst flows from the reactor through catalyst flow-control means such as a throttle valve 325 into conduits 326 and 327 from which it flows into the reactor-sealing and catalyst transfer means comprising gas-tight valves 328 and 332, intermediate pressuring chamber 330 and conduit 334 and the alternate reactor-sealing and catalyst transfer means comprising gas-tight valves 329 and 333, intermediate pressuring chamber 331 and conduit 335. These reactor-sealing and catalyst-transfer means operate in a cyclic manner similar to that described hereinbefore.

Thus, starting with both chambers 330 and 331 empty, and gas-tight valves 328, 332, 329 and 333 closed, suitable pressuring gas drawn from a source not shown flows under pressure through pipes 375 and 377 under control of valves 376 and 378 with valves 374, 380, 392 and 340 closed until the pressure in chamber 330 is approximately that in reactor 324. Valves 376 and 378 close and gas-tight valve 328 opens permitting deactivated catalyst to flow into chamber 330 to a predetermined level. Gas-tight valve 328 closes. With valves 363, 365, 367, 369 and 371 closed, valve 340 opens and pressuring gas flows from chamber 330 through pipe 372 into chamber 331 until the pressures in chambers 330 and 331 are about equal. Valve 340 closes and valves 363 and 365 open permitting pressuring gas such as recycle gas under pressure to flow through pipe 362 into chamber 331 until the pressure therein is about equal to that of the reactor. Valve 329 opens and catalyst flows from conduit 327 into vessel 331. After vessel 331 is filled, valve 329 closes. At about the same time, valve 392 opens and the residual gas in chamber 330 is vented after which valves 374 and 378 open and a purge gas is passed through chamber 330 and vented through line 379 under control of valve 380 with valve 392 closed. After chamber 330 is purged, gas-tight valve 332 is opened permitting the catalyst to flow along conduit 334 to surge chamber 336. When chamber 330 is empty of catalyst it is ready to be pressurized partly by gas from chamber 331 and partly by recycle gas introduced from pipe 375. Accordingly, valve 340 opens and pressuring gas flows from chamber 331 through pipe 372 into chamber 330. When the pressure in both chambers is approximately equal, valve 340 closes and valve 369 opens and the residual gas in chamber 331 is vented to atmospheric pressure through pipe 368. When the pressure in chamber 331 is atmospheric or that of the kiln or regenerator, purge gas is drawn from a source not shown through pipe 366 under control of valve 367 with valve 365 open and valve 363 closed and passed through chamber 331. The purge is vented through pipes 368 and 370 with valve 371 open and valve 369 closed. After chamber 331 has been purged, gas-tight valve 333 opens and the deactivated catalyst flows along conduit 335 to surge chamber 336. When chamber 331 is empty of catalyst, gas-tight valve 333 closes and chamber 331 is ready to be pressurized partly with gas from chamber 330 and partly with gas from a source not shown.

The deactivated catalyst in chamber 336 flows through conduit 337 and chute 338 to any suitable catalyst transfer means such as a gas-lift and the like, an elevator, etc., by means of which it is transferred to a suitable kiln or regenerator not shown wherein the carbonaceous contaminant is burned-off in a stream of combustion supporting gas such as air.

Having traced the path of the catalyst through the reactor-sealing and catalyst-transfer means and the reactor, it is manifest that the present method of reforming hydrocarbons at superatmospheric pressures in the presence of a substantially compact column of particle-form catalyst permits a major saving in the pressuring gas required to transfer the catalyst from a zone at a given pressure to a zone of higher pressure and back to a zone of given lower pressure. Accordingly, the course of the vapors through the reactor will be followed.

A hydrocarbon reactant comprising at least one hydrocarbon capable of undergoing at least one of the molecular changes, isomerization, dehydrogenation and dehydrocyclization is heated in a furnace not shown to a temperature below a thermal reforming temperature. A gaseous heat carrier containing less than about 25 per cent hydrogen or a gas containing about 25 to about 80, preferably about 35 to about 60, per cent hydrogen, balance $C_1$ to $C_6$ hydrocarbons, such as recycle gas is heated in a furnace, not shown, to a temperature such that when mixed with the heated hydrocarbon reactant in the ratio of about 1 to about 15, preferably about 4 to about 10 mols of recycle gas per mol of hydrocarbon reactant or in the ratio of about 1 to about 8, preferably about 2 to about 5, mols of hydrogen per mol of hydrocarbon reactant, the charge mixture so formed has a temperature of about 800° to about 1080° F., preferably about 900° to about 1060° F. When the hydrocarbon reactant is a mixture of hydrocarbons, the average molecular weight is determined in the usual manner from the A. S. T. M. distillation curve.

The heated hydrocarbon reactant flows along line 381 under control of valve 382 into line 383. The heated gaseous heat carrier or hydrogen-containing recycle gas flows along pipe 384 under control of valve 385 into line 383 where the heated hydrocarbon reactant and heated gas mix to form a charge mixture. The charge mixture flows into distributor 386 from which a part of the mixture flows upwardly counter-current to the downwardly flowing substantially compact column of particle-form catalyst, while the balance flows downwardly concurrent with the downwardly flowing substantially compact column of particle-form catalyst.

The vaporous mixture flowing upwardly from distributor 386 through reforming zone U passes therefrom through line 387 under control of throttling means 389 whereby in conjunction with throttling means 390, the distribution of charge mixture between zones U and L is controlled. The effluent from zone U flows along line 387 to line 391 where it mixes with effluent from zone L which leaves zone L through line 388 under control of throttling means 390. The mixed effluents flow through line 391 to heat exchangers, condensers, gas-liquid separators, fractionators and after-treatment, not shown.

Figures 4, 5:
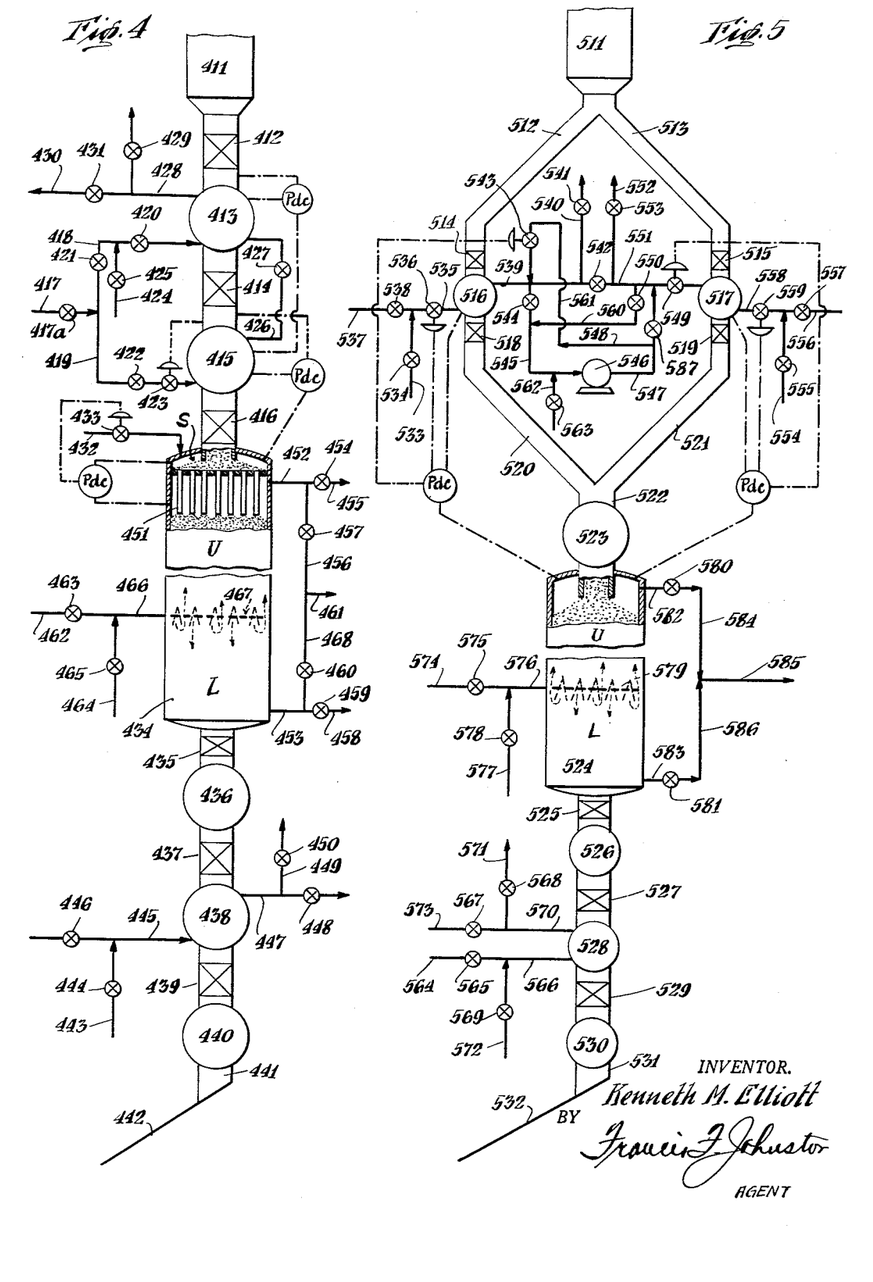
Figure 4 is a highly schematic representation of a reactor and catalyst pressuring and depressuring locks illustrating the principles of the present invention.
Figure 5 is a highly schematic representation of a reactor and catalyst pressuring lock illustrating the principles of the present invention.

Referring now to Figure 4. Catalyst flows from reactor feed bin 411 to reactor sealing and catalyst transfer means comprising the three gas-tight valves 412, 414 and 416, and the pressuring chambers 413 and 415. The reactor-sealing and catalyst transfer means operates in a cyclic manner as follows: With gas-tight valve 416 closed, catalyst flows from feed bin 411 into chamber 415 until it is filled to a predetermined level. Gas-tight valve 414 closes and catalyst flows into chamber 413 until it is filled to a predetermined level, then gas-tight valve 412 closes. Purge gas, i. e., an inert and/or non-flammable gas such as flue gas is drawn from a source not shown through pipe 424 with valves 425, 421, 422 and 423 open and valves 420 and 417a closed and introduced into chamber 415. The purge gas flows through chamber 415 and pipe 426 under control of valve 427 into chamber 413. The purge gas passes through chamber 413 and is vented through pipe 428 under control of valve 429. After chambers 415 and 413 have been purged, valves 425, 429 and 427 close and valves 417a, 422 and 423 open and pressuring gas such as recycle gas described hereinbefore flows under pressure into chamber 415 until the pressure therein is at least equal to and preferably about 5 p. s. i. higher than the pressure in reactor 434. Valves 423 and 422 close, and gas-tight valve 416 opens permitting catalyst to flow into reactor 434. When chamber 415 is empty of catalyst, gas-tight valve 416 closes and valve 427 opens. The gas in chamber 415 being at the pressure of the reactor flows through pipe 426 into chamber 413 until the pressures in both chambers are about equal. Valve 427 then closes and gas-tight valve 414 opens permitting catalyst in chamber 413 to flow into chamber 415. When chamber 413 is empty of catalyst, valve 414 closes and the residual gas vented through pipes 428 and 430 under control of valve 431, valves 417a, 422 and 423 open permitting pressuring gas to flow into chamber 415 until the pressure therein is equal to or greater than the pressure in the reactor. Meanwhile, chamber 413 has been purged by purge gas drawn through pipe 424 with valves 425 and 420 open and valve 421 closed. The purge is vented from chamber 413 through pipe 428 under control of valve 429. After the purge of chamber 413, gas-tight valve 412 opens and catalyst flows into chamber 413 to a predetermined level. When gas-tight valve 412 closes, valve 416 opens, catalyst flows from chamber 415 into reactor 434 and when chamber 415 is empty of catalyst, gas-tight valve 416 closes and valve 427 opens to bring the pressure in chambers 413 and 415 to equilibrium. Opening of gas-tight valve 414 permits flow of catalyst into chamber 415 and the cycle continues.

The catalyst flows from chamber 415 through gas-tight valve 416 into seal zone S of reactor 434 and through seal legs 451 into and through reforming zones U and L as a substantially compact column of particle-form catalyst. A sealing gas such as steam, inert gas such as flue gas, or recycle gas is admitted to seal zone S through pipe 432 under control of valve 433 which in turn is regulated by a suitable pressure differential control to maintain the pressure in seal zone S about 0.5 p. s. i. higher than the pressure in the upper part of zone U.

The catalyst flows downwardly through zones U and L and is deactivated in the passage therethrough by deposition of a carbonaceous contaminant, coke, which is removed by burning-off in a combustion supporting stream of gas such as air. The deactivated catalyst flows from the reactor through catalyst flow control means 435 such as a throttle valve to surge chamber 436. When the coke is to be burned-off in a regenerator or kiln operating at a pressure lower than that of the reactor, a reactor-sealing and solid-particle transfer means is required to remove the deactivated catalyst from the reactor and transfer it to a kiln or regenerator. Such a reactor-sealing and catalyst-transfer means can comprise gas-tight valves 437 and 439 and intermediate pressuring chamber 438. This reactor-sealing and catalyst-transfer means operates in a cyclic manner as follows: With gas-tight valve 437 and 439 closed, suitable pressuring gas such as recycle gas, drawn under pressure from a source not shown, flows through pipe 445 under control of valve 446 with valve 444 closed until the pressure in chamber 438 is about equal to that in reactor 434. Gas-tight valve 437 opens and catalyst flows from surge chamber 436 into pressuring chamber 438 to a predetermined level when valve 437 closes. The pressure in chamber 438 is reduced to that of the kiln or regenerator, not shown, by venting the gas from chamber 438 through pipes 447 and 449 with valve 450 open and valve 448 closed. Thereafter the chamber and its contents are purged with an inert and/or non-flammable gas such as flue gas drawn from a source not shown through pipes 443 and 445 under control of valve 444 with valve 446 closed and vented through pipe 447 under control of valve 448 with valve 450 closed. After the purge, gas-tight valve 439 opens and the deactivated catalyst flows into surge chamber 440. From surge chamber 440 the deactivated catalyst flows along conduit 441 and chute 442 to a suitable catalyst transfer means such as gas-lift and the like, an elevator, etc., not shown, by means of which the catalyst is transferred to a kiln or regenerator of suitable type, not shown, wherein the coke is burned off in a combustion-supporting stream of gas such as air.

Now the course of the vapors through the reactor will be traced. Hydrocarbon reactant drawn from a source, not shown, and heated in a furnace, not shown, to a temperature below thermal reforming temperature flows along line 462 under control of valve 463 into line 466. A suitable gaseous heat carrier such as gas containing less than about 25 per cent hydrogen, or hydrogen, or a recycle gas containing about 25 to about 80, preferably about 35 to about 60, per cent hydrogen balance $C_1$ to $C_6$ hydrocarbons is heated in a furnace, not shown, and flows under pressure through pipe 464 under control of valve 465 to line 466. In line 466 the heated gas is mixed with heated hydrocarbon reactant in the ratio of about 1 to about 15, preferably about 4 to about 10, mols of gas per mol of hydrocarbon reactant or in the ratio of about 1 to about 8, preferably about 2 to about 5, mols of hydrogen per mol of hydrocarbon reactant thereby producing a charge mixture having a temperature of about 800° to about 1080° F. and preferably about 900° to about 1060° F.

The charge mixture flows from line 466 into distributor 467 from which the charge mixture flows in part upwardly through zone U and partly downwardly through zone L. The distribution of charge mixture between zones U and L is regulated by valves 454 (457) and valves 459 (460).

The vapors in zone U escape through line 452 and when to be kept separate from the effluent of zone L pass through suitable throttling means 454 such as a throttle valve to line 455 to heat exchangers, condensers, fractionators, and the like, not shown. When the effluent from zone U is to be mixed with the effluent from zone L, valve 454 is closed and valve 457 opened whereby the effluent from zone U passes through line 456 to line 461.

The vapors in zone L pass through lines 453 and 458 under control of valve 459 when the effluent from zone L is to be kept separate from the effluent of zone U to heat exchangers, condensers and fractionators, not shown. When the effluent from zone L is to be combined with the effluent from zone U, it passes through lines 453 and 468 under control of valve 460 to line 461 and thence to heat exchangers, condensers, fractionators and the like, not shown.

Referring now to Figure 5. Active catalyst in reactor feed bin 511 flows through conduits 512 and 513 to alternate reactor-sealing and catalyst-transfer means comprising (1) gas-tight valves 514 and 518 and intermediate pressuring vessel 516, and (2) gas-tight valves 515 and 519 and intermediate pressuring vessel 517. The reactor-sealing and catalyst-transfer means operate in a cyclic manner as follows: With gas-tight valves 518, 515 and 519 closed, gas-tight valve 514 opens admitting catalyst to pressuring chamber 516 to a predetermined level. Gas-tight valve 514 closes and chamber 516 is purged with an inert and/or non-flammable gas such as flue gas drawn from a source, not shown, through pipes 533 and 535 with valves 534 and 536 open and valve 538 closed. The purge is vented through pipes 539 and 540 with valves 542 and 543 closed and valve 541 open. When chamber 516 and its contents are purged, a suitable pressuring gas such as recycle gas under pressure flows through pipes 537 and 535 with valves 538 and 536 open and valves 541, 542, 543 and 544 closed until the pressure in chamber 516 is at least equal to and preferably somewhat higher than the pressure in reactor 524. Simultaneously, gas-tight valve 515 opens and catalyst flows into pressuring chamber 517 to a predetermined level. Gas-tight valve 515 closes and purge gas is introduced into chamber 517 through pipes 554 and 558 with valves 555 and 559 open and valve 557 closed. The purge is vented through pipes 551 and 552 with valve 553 open and valve 542 closed. Valves 553, 555 and 559 close and the pressuring chamber 517 is ready to be pressurized.

Chamber 516 is at a pressure at least equal to and preferably somewhat greater than the pressure in reactor 524. Gas-tight valve 518 opens and catalyst flows through conduits 520 and 522 to surge bin 523. When chamber 516 is empty of catalyst, gas-tight valve 518 closes and valve 542 opens as a result of which the gas in chamber 516 flows through pipes 539 and 551 to chamber 517. When the pressures in chambers 516 and 517 are equalized, valve 542 closes, valve 544 opens and compressor 546 begins to draw gas from chamber 516 through pipes 539 and 545 and pump the gas through pipes 547 and 551 with valve 549 open into chamber 517 until the pressure in chamber 517 is at least equal to and preferably somewhat higher than the pressure in reactor 524. Then valve 549 closes, the compressor 546 stops, and gas-tight valve 519 opens permitting catalyst to flow through conduits 521 and 522 into surge bin 523. Meanwhile, gas-tight valve 514 opens, catalyst flows into pressuring chamber 516 to a predetermined level, gas-tight valve 514 closes and chamber 516 and the contents thereof are purged and the purge vented as described hereinbefore. Valves 541, 543 and 544 are closed and valves 542 and 549 opened and gas flows from chamber 517 through pipes 551 and 539 until the pressures in chambers 517 and 516 equalize. Valve 542 closes, valve 550 opens and with valve 544 closed and valves 550 and 543 open, compressor 546 draws gas from chamber 517 through pipes 551, 560 and 545, and discharges the gas into chamber 516 through pipes 547, 548, 561 and 539 with valve 587 closed and valve 543 open until the pressure in chamber 516 is equal to or greater than that in reactor 524. The catalyst in chamber 516 is then ready to be passed to surge bin 523 and chamber 517 is ready for another charge of catalyst. Such make-up gas as is necessary for pressuring can be admitted directly to either chamber 516 or chamber 517 through pipes 537 and 556, respectively, or through pipes 562 and 545 under control of valve 563 to compressor 546.

The catalyst in surge bin 523 flows as a substantially compact column of particle-form catalyst into and through reactor 524. During passage through reactor 524, the catalyst is deactivated by the deposition thereon of a carbonaceous contaminant requiring regeneration by combustion of the contaminating deposit in a stream of combustion supporting gas. The catalyst flows from reactor 524 through catalyst flow control means 525, for example a throttle valve, into surge chamber 526 and thence to a reactor-sealing and solid-particle transfer means of any suitable type. The reactor-sealing and solid-particle transfer means illustrated is a depressuring lock comprising gas-tight valve 527 and 529 and intermediate depressuring chamber 528.

The reactor-sealing and catalyst-transfer means operates in a cyclic manner as follows: Suitable pressuring gas such as recycle gas drawn from a source not shown flows under pressure through pipe 564 under control of valve 565 into pipe 566 and chamber 528 (valves 567, 568 and 569 being closed) until the pressure therein is about equal to that in reactor 524. Gas-tight valve 527 opens and catalyst flows into chamber 528 to a predetermined level. Gas-tight valve 527 closes and valve 568 opens to permit the gas in chamber 528 to be vented through pipes 570 and 571 until the pressure in chamber 528 is about that of the pressure in the regenerator such as 45 of Figure 1. Chamber 528 and the contents thereof are then purged with an inert and/or nonflammable gas such as flue gas drawn from a source not shown through pipes 572 and 566 under control of valve 569, with valve 565 closed. The purge is vented through pipes 570 and 573 under control of valve 567, with valve 568 closed. When chamber 528 is purged, gas-tight valve 529 opens and the catalyst flows into surge chamber 530. When chamber 528 is empty of catalyst, gas-tight valve 529 closes completing the cycle.

The catalyst flows from surge chamber 530 through conduit 531 and chute 532 to any suitable catalyst transfer means, not shown, by which the catalyst is transferred to a regenerator, not shown.

The path of the reactant and gases into and from reactor 524 is as follows: A suitable hydrocarbon reactant such as a naphtha comprising hydrocarbon susceptible to isomerization, dehydrogenation or dehydrocyclization or of any two or of all the foregoing molecular changes, is drawn from a source not shown, heated in a furnace, not shown, to a catalytic reforming temperature but below a thermal reforming temperature and flows through line 574 under control of valve 575 into line 576. A gaseous heat carrier or a hydrogen-containing gas generally containing about 25 to about 80 per cent, preferably about 35 to about 60 per cent, hydrogen and balance $C_1$ to $C_6$ hydrocarbons is drawn from a source, not shown, and heated in a furnace, not shown, to a temperature such that when mixed with the aforesaid heated hydrocarbon reactant in the ratio of about 1 to about 15, preferably about 4 to about 10, mols of gas per mol of hydrocarbon reactant or, about 1 to about 8, preferably about 2 to about 5, mols of hydrogen per mol of hydrocarbon reactant to form a charge mixture, the charge mixture has a temperature of about 850° to about 1080° F. and preferably about 900° to about 1060° F. The heated gas flows under pressure through pipe 577 under control of valve 578 into line 576 where it mixes with the heated hydrocarbon reactant to form the charge mixture. The charge mixture flows from line 576 into distributor 579 which is of any suitable type whereby the charge mixture can be distributed over the cross-section of reactor 524.

The charge mixture flows from distributor 579 partly upwardly counter-current to the downwardly flowing substantially compact column of particle-form catalyst and partly downwardly concurrent with the downwardly flowing substantially compact column of particle-form catalyst. The distribution of charge mixture between zones U and L being controlled and regulated by throttling means 580 and 581 which can be of any suitable type such as throttling valves in lines 582 and 583, respectively. The effluent from zone U flows along line 584 to line 585 while the effluent from zone L flows along line 586. The two effluents mix in line 585 and flow therefrom to heat exchangers, condensers, gas-liquid separators and fractionators such as shown in Figure 1.

In general, the reforming reaction described hereinbefore takes place under the conditions tabulated as follows:

| Reactor | Conditions | |
|---|---|---|
| | Broad | Preferred |
| Vapor Inlet Temp., ° F | 100–1,100 | 900–1,060 |
| Cat. Inlet Temp., ° F | 100–1,200 | 700–1,050 |
| Space Velocity: | | |
| Volume HC to Reactor/hr | 0.1–6.0 | 0.5–2.5 |
| Volume of Catalyst | | |
| Recycle Ratio: | | |
| Mols H₂ | 1–8 | 2–5 |
| Mols HC Reactant | | |
| Mols Recycle Gas | 1–15 | 4–10 |
| Mols HC Reactant | | |
| Pressure, p. s. i. a | 15–600 | 100–300 |
| Kiln Temperature, ° F | 600–1,400 | 700–1,100 |
| Kiln Pressure, p. s. i. a | 15–600 | 15–35 |

The foregoing description of the present invention is that of an improvement in reforming hydrocarbons capable of undergoing at least one of the molecular changes, isomerization, dehydrogenation, and dehydrocyclization, at superatmospheric pressure wherein particle-form solid catalyst is transferred from a zone at a given pressure by means of a catalyst transfer zone wherein the catalyst is pressurized to a reaction zone pressure higher than the aforesaid given pressure, flows into said reaction zone, the pressure in the catalyst transfer zone is reduced to that of said given pressure by venting pressuring gas, the catalyst flows downwardly through said reaction zone at said higher reaction zone pressure as a substantially compact column of particle-form catalyst, hydrocarbon reactant and gaseous heat carrier contacts said catalyst during its downward passage through said reaction zone, said catalyst flows from said reaction zone into a catalyst transfer zone under gaseous pressure about equal to the pressure in said reaction zone, said transfer zone pressure is reduced to the lower pressure of a regenerating zone by venting said gas, said catalyst is regenerated in a combustion-supporting stream of gas at a pressure which comprises flowing catalyst from a zone of given pressure into a first catalyst transfer zone, introducing gas into said first catalyst transfer zone until the pressure therein is at least equal to the pressure in a reaction zone at higher pressure than said given pressure, flowing said catalyst from said first catalyst transfer zone into said reaction zone, closing the passage from said first catalyst transfer zone to said reaction zone to leave a first catalyst transfer zone substantially empty of catalyst-containing gas at about the pressure of said reaction zone, flowing catalyst downwardly as a substantially compact column of particle-form catalyst through said reaction zone in contact with hydrocarbon reactant to be reformed therein and gaseous heat carrier, withdrawing vaporous and gaseous products of reaction from said reaction zone, flowing gas from said first catalyst transfer zone to a second catalyst transfer zone until the pressures in said second catalyst transfer zone and said first catalyst zone equalize, venting gas from said first catalyst transfer zone until the pressure therein is about that of the aforesaid given pressure, introducing gas into said second catalyst transfer zone until the pressure therein is about that of said reaction zone, flowing catalyst into said second catalyst transfer zone, releasing gas from said second catalyst transfer zone, and flowing catalyst from said second catalyst transfer zone, and transferring catalyst to a regenerator. In other words, the present invention is an improvement in a reforming process carried out at super-atmospheric pressures wherein the pressuring gas of the catalyst transfer zones, at least in part, is re-used rather than discarded.

I claim:

1. A method of reforming hydrocarbons capable of being reformed wherein a particle-form solid contact mass material flows downwardly from a zone at given pressure into a pressurizing catalyst-transfer zone, introducing gas into said pressurizing catalyst-transfer zone until the pressure therein is at least equal to the pressure in a reaction zone higher than said given pressure, flowing said catalyst downwardly from said pressurizing catalyst-transfer zone into said reaction zone, contacting said catalyst with reformable hydrocarbon reactant and gaseous heat carrier in said reaction zone, flowing said catalyst downwardly from said reaction zone into a second, depressurizing catalyst-transfer zone at a pressure substantially equal to the pressure in said reaction zone, reducing the pressure in said second, depressurizing catalyst-transfer zone to about that of a regenerating zone and venting only a portion of the gas introduced into said pressurizing, and depressurizing catalyst-transfer zones.

2. In the reforming of a reformable hydrocarbon which comprises flowing particle-form solid contact mass material downwardly from a zone of given pressure into a pressurizing catalyst-transfer zone, introducing gas into said pressurizing catalyst-transfer zone until the pressure therein is at least equal to the pressure in a reaction zone at a pressure higher than said given pressure, flowing catalyst from said pressurizing catalyst-transfer zone downwardly into said reaction zone, venting gas from said pressurizing catalyst-transfer zone until the pressure therein is equal to said given pressure, flowing said catalyst downwardly as a substantially compact column in contact with reformable hydrocarbon reactant and gaseous heat carrier through said reaction zone, introducing gas into a second, depressurizing catalyst-transfer zone until the pressure therein is about equal to said reaction zone pressure, flowing catalyst from said reaction zone downwardly into said second, depressurizing catalyst-transfer zone, venting gas in said second, depressurizing catalyst-transfer zone until the pressure therein is lower than said reaction zone pressure and about equal to the pressure of a regenerating zone, and transferring catalyst to said regenerating zone, the improvement which comprises introducing gas from one of said pressurizing, depressurizing catalyst-transfer zones into the other of said pressurizing, depressurizing catalyst-transfer zones to pressurize said other pressurizing, depressurizing catalyst-transfer zone.

3. In the reforming of reformable hydrocarbons which comprises flowing particle-form solid contact mass material downwardly from a zone of given pressure into a pressurizing catalyst-transfer zone, introducing gas into said pressurizing catalyst-transfer zone until the pressure therein is at least equal to the pressure in a reaction zone at a pressure higher than said given pressure, flowing catalyst from said pressurizing catalyst-transfer zone downwardly into said reaction zone, venting gas from said pressurizing catalyst-transfer zone until the pressure therein is equal to said given pressure, flowing said catalyst downwardly as a substantially compact column in contact with reformable hydrocarbon reactant and gaseous heat carrier through said reaction zone, introducing gas into a second depressurizing catalyst-transfer zone until the pressure therein is about equal to said reaction zone pressure, flowing catalyst downwardly from said reaction zone into said second pressurizing catalyst-transfer zone, venting gas in said second depressurizing catalyst-transfer zone until the pressure therein is lower than the said reaction zone pressure and about equal to the pressure of the regenerating zone, and transferring catalyst to said regenerating zone, the improvement which comprises emptying said first pressurizing catalyst-transfer zone of catalyst, filling to a predetermined level with catalyst said second depressurizing catalyst-transfer zone and introducing gas under the pressure of said first pressurizing catalyst transfer zone into said second depressurizing catalyst-transfer zone until the pressures in both pressurizing and depressurizing catalyst-transfer zones are about the same, and introducing pressuring gas from an extraneous source into said second depressurizing catalyst-transfer zone until the pressure therein is about equal to the pressure in said reaction zone.

4. In the reforming of reformable hydrocarbons which comprises flowing particle-form solid contact mass material downwardly from a zone of given pressure into a pressurizing catalyst-transfer zone, introducing gas into said pressurizing catalyst-transfer zone until the pressure therein is at least equal to the pressure in a reaction zone at a pressure higher than said given pressure, flowing catalyst from said pressurizing catalyst transfer zone downwardly into said reaction zone, venting gas from said pressurizing catalyst transfer zone until the pressure therein is equal to said given pressure, flowing said catalyst downwardly as a substantially compact column in contact with reformable hydrocarbon reactant and gaseous heat carrier through said reaction zone, introducing gas into a second depressurizing catalyst-transfer zone until the pressure therein is about equal to said reaction zone pressure, flowing catalyst from said reaction zone downwardly into said second depressurizing catalyst-transfer zone, venting gas in said second catalyst-transfer zone until the pressure therein is lower than the said reaction pressure and about equal to the pressure of the regenerating zone, and transferring catalyst to said regenerating zone, the improvement which comprises introducing catalyst into one of two first pressurizing catalyst-transfer zones, introducing gas into said one of two first pressurizing catalyst-transfer zones until the pressure therein is at least about equal to the pressure in a reaction zone which is higher than the aforesaid given pressure, flowing catalyst from said first of two first pressurizing catalyst-transfer zones downwardly into said reaction zone, introducing catalyst into a second of said first pressurizing catalyst-transfer zones, introducing pressuring gas from the first of said first pressurizing catalyst-transfer zones into said second of said first pressurizing catalyst-transfer zones until the pressures in both of said first pressurizing catalyst-transfer zones is equalized, introducing pressuring gas from an extraneous source into said second of said first pressurizing catalyst-transfer zones until the pressure therein is at least about equal to the higher pressure of said reaction zone, flowing catalyst from said second of said first pressurizing catalyst-transfer zones downwardly into said reaction zone and repeating the aforesaid operations in a cyclic manner, introducing pressuring gas into the first of two second depressurizing catalyst-transfer zones until the pressure therein is about equal to the higher pressure in said reaction zone and higher than the pressure in a regenerating zone, flowing catalyst downwardly into said first of said second depressurizing catalyst-transfer zones, introducing gas from said first of said second catalyst-transfer zones into a second of said second depressurizing catalyst-transfer zones until the pressures in said second depressurizing catalyst-transfer zones are equalized, venting the gas in the first of said second depressurizing catalyst-transfer zones until the pressure therein is about equal to the pressure in a regenerating zone and transferring catalyst from said first of said second depressurizing catalyst-transfer zones to said regeneration zone, introducing gas into said second of said second depressurizing catalyst-transfer zones until the pressure therein is about equal to the pressure in said reaction zone and higher than the pressure in said regeneration zone, flowing catalyst from said reaction zone downwardly into the second of said second depressurizing catalyst-transfer zones, introducing pressuring gas from said second of said second depressurizing catalyst-transfer zones into said first of said second depressurizing catalyst-transfer zones, venting the residual gas in said second of said depressurizing catalyst-transfer zones, transferring catalyst from said second of said depressurizing catalyst-transfer zones to said regeneration zone and repeating the aforesaid operations in a cyclic manner.

5. In the reforming of reformable hydrocarbons which comprises flowing particle-form solid contact mass material downwardly from a zone of given pressure into a pressurizing catalyst-transfer zone, introducing gas into said pressurizing catalyst transfer zone until the pressure therein is at least equal to the pressure in a reaction zone at a pressure higher than said given pressure, flowing catalyst from said pressurizing catalyst-transfer zone downwardly into said reaction zone, venting gas from said pressurizing catalyst-transfer zone until the pressure therein is equal to said given pressure, flowing said catalyst downwardly as a substantially compact column in contact with reformable hydrocarbon reactant and gaseous heat carrier through said reaction zone, introducing gas into a second depressurizing catalyst-transfer zone until the pressure therein is about equal to said reaction zone pressure, flowing catalyst from said reaction zone downwardly into said second depressurizing catalyst-transfer zone, venting gas in said second depressurizing catalyst-transfer zone until the pressure therein is lower than the said reaction zone pressure and about equal to the pressure of the regenerating zone, and transferring catalyst to said regenerating zone, the improvement which comprises introducing catalyst into two pressurizing catalyst-transfer zones in series until both pressurizing catalyst-transfer zones are each filled to a predetermined level, introducing pressurizing gas into the second of the aforesaid pressurizing catalyst-transfer zones until the pressure therein is at least about equal to the pressure in a reaction zone, flowing catalyst from said second pressurizing catalyst-transfer zone downwardly into said reaction zone, introducing gas from said second pressurizing catalyst-transfer zone into the other pressurizing catalyst-transfer zone until the pressures in both pressurizing catalyst-transfer zones are equalized, flowing catalyst from the first of said pressurizing catalyst-transfer zones downwardly into the second of said pressurizing catalyst transfer zones, introducing pressuring gas from an extraneous source into the second of said pressurizing catalyst-pressuring zones until the pressure therein is at least about equal to the pressure in the aforesaid reaction zone, flowing catalyst from said second pressurizing catalyst-transfer zone downwardly into said reaction zone, flowing catalyst into the first of said pressurizing catalyst transfer zones, and repeating the aforesaid operations in a cyclic manner.

6. In the reforming of reformable hydrocarbons which comprises flowing particle-form solid contact mass material from a zone of given pressure downwardly into a pressurizing catalyst-transfer zone, introducing gas into said pressurizing catalyst-transfer zone until the pressure therein is at least equal to the pressure in a reaction zone at a pressure higher than said given pressure, flowing catalyst from said pressurizing catalyst-transfer zone downwardly into said reaction zone, venting gas from said pressurizing catalyst-transfer zone until the pressure therein is equal to said given pressure, flowing said catalyst downwardly as a substantially compact column in contact with reformable hydrocarbon reactant and gaseous heat carrier through said reaction zone, introducing gas into a second depressurizing catalyst-transfer zone until the pressure therein is about equal to said reaction zone pressure, flowing catalyst from said reaction zone downwardly into said second depressurizing catalyst-transfer zone, venting gas in said second depressurizing catalyst-transfer zone until the pressure therein is lower than the said reaction zone pressure and about equal to the pressure of the regenerating zone, and transferring catalyst to said regenerating zone, the improvement which comprises flowing catalyst into one of two pressurizing catalyst-transfer zones, introducing pressuring gas from an extraneous source into said pressurizing catalyst-transfer zone until the pressure therein is at least about equal to the pressure in a reaction zone, flowing catalyst downwardly into a second pressurizing catalyst transfer zone, flowing catalyst from said first pressurizing catalyst transfer zone downwardly into a reaction zone, introducing pressuring gas from said first pressurizing catalyst-transfer zone into said second pressurizing catalyst-transfer zone, mechanically transferring residual gas from said first pressurizing catalyst-transfer zone under pressure into said second pressurizing catalyst-transfer zone until the pressure therein is at least about equal to the pressure in the aforesaid reaction zone, flowing catalyst downwardly into the first of said pressurizing catalyst-transfer zones, flowing catalyst from said second pressurizing catalyst-transfer zone downwardly into said reaction zone, and repeating the aforesaid operations in a cyclic manner.

References Cited in the file of this patent

UNITED STATES PATENTS

| | | |
|---|---|---|
| 2,274,003 | Sheppard | Feb. 24, 1942 |
| 2,546,625 | Bergstrom | Mar. 27, 1951 |
| 2,684,390 | Bills | July 20, 1954 |
| 2,684,930 | Berg | July 27, 1954 |